(12) United States Patent
Lotz

(10) Patent No.: US 9,051,123 B2
(45) Date of Patent: Jun. 9, 2015

(54) DROP CHUTE ASSEMBLY FOR PAPER HANDLING SYSTEM

(71) Applicant: LOTZ Industrial Printer Co., Zieglerville, PA (US)

(72) Inventor: Paul B. Lotz, Zieglerville, PA (US)

(73) Assignee: LOTZ INDUSTRIAL PRINTER CO., Zieglerville, PA (US)

( * ) Notice: Subject to any disclaimer, the term of this patent is extended or adjusted under 35 U.S.C. 154(b) by 0 days.

(21) Appl. No.: 14/172,934

(22) Filed: Feb. 5, 2014

(65) Prior Publication Data

US 2014/0216887 A1    Aug. 7, 2014

Related U.S. Application Data

(60) Provisional application No. 61/762,085, filed on Feb. 7, 2013.

(51) Int. Cl.
| | |
|---|---|
| *B65G 11/16* | (2006.01) |
| *B65G 47/44* | (2006.01) |
| *B65G 11/08* | (2006.01) |
| *B65H 5/02* | (2006.01) |
| *B65H 5/38* | (2006.01) |

(52) U.S. Cl.
CPC ............ *B65G 11/163* (2013.01); *B65G 11/081* (2013.01); *B65G 47/44* (2013.01); *B65H 5/025* (2013.01); *B65H 5/38* (2013.01); *B65H 2301/3421* (2013.01); *B65H 2404/5213* (2013.01); *B65H 2404/6111* (2013.01); *B65H 2404/692* (2013.01)

(58) Field of Classification Search
CPC ........ B65G 11/00; B65G 11/02; B65G 11/04; B65G 11/08; B65G 11/081; B65G 11/16; B65G 11/163; B65G 47/44
USPC .................. 198/525, 560; 193/2 R, 8, 33, 34
See application file for complete search history.

(56) References Cited

U.S. PATENT DOCUMENTS

| | | | | |
|---|---|---|---|---|
| 1,738,427 A * | 12/1929 | Life et al. | ...................... | 198/560 |
| 1,826,379 A * | 10/1931 | Creedon et al. | ............... | 198/406 |
| 1,929,109 A * | 10/1933 | Cutler | ............................ | 198/535 |
| 3,513,956 A * | 5/1970 | Rayment | ........................ | 193/44 |
| 6,135,171 A * | 10/2000 | Weakly et al. | ................ | 141/286 |
| 7,134,543 B2 * | 11/2006 | Barry et al. | ............... | 198/810.03 |
| 7,228,956 B2 * | 6/2007 | Pircon et al. | .................. | 198/560 |
| 7,264,107 B2 * | 9/2007 | Lawrence | ..................... | 198/404 |
| 2012/0000746 A1 * | 1/2012 | Seger et al. | .................... | 198/500 |

FOREIGN PATENT DOCUMENTS

| | | | | |
|---|---|---|---|---|
| DE | 4211287 A1 * | 10/1993 | ............. | B65G 11/16 |
| WO | WO9321089 | * 10/1993 | ............. | B65G 11/16 |

* cited by examiner

*Primary Examiner* — Mark A Deuble
(74) *Attorney, Agent, or Firm* — Duane Morris LLP

(57) ABSTRACT

A paper transport system includes a first conveyor, a second conveyor, and a drop chute assembly. The first conveyor has a belt for transporting paper disposed at a first elevation. The second conveyor has a belt for transporting paper disposed at a second elevation that is different from the first elevation. The drop chute assembly is positioned between the first conveyor and the second conveyor. The drop chute assembly is configured to receive paper from the first conveyor and output the paper to the second conveyor.

20 Claims, 10 Drawing Sheets

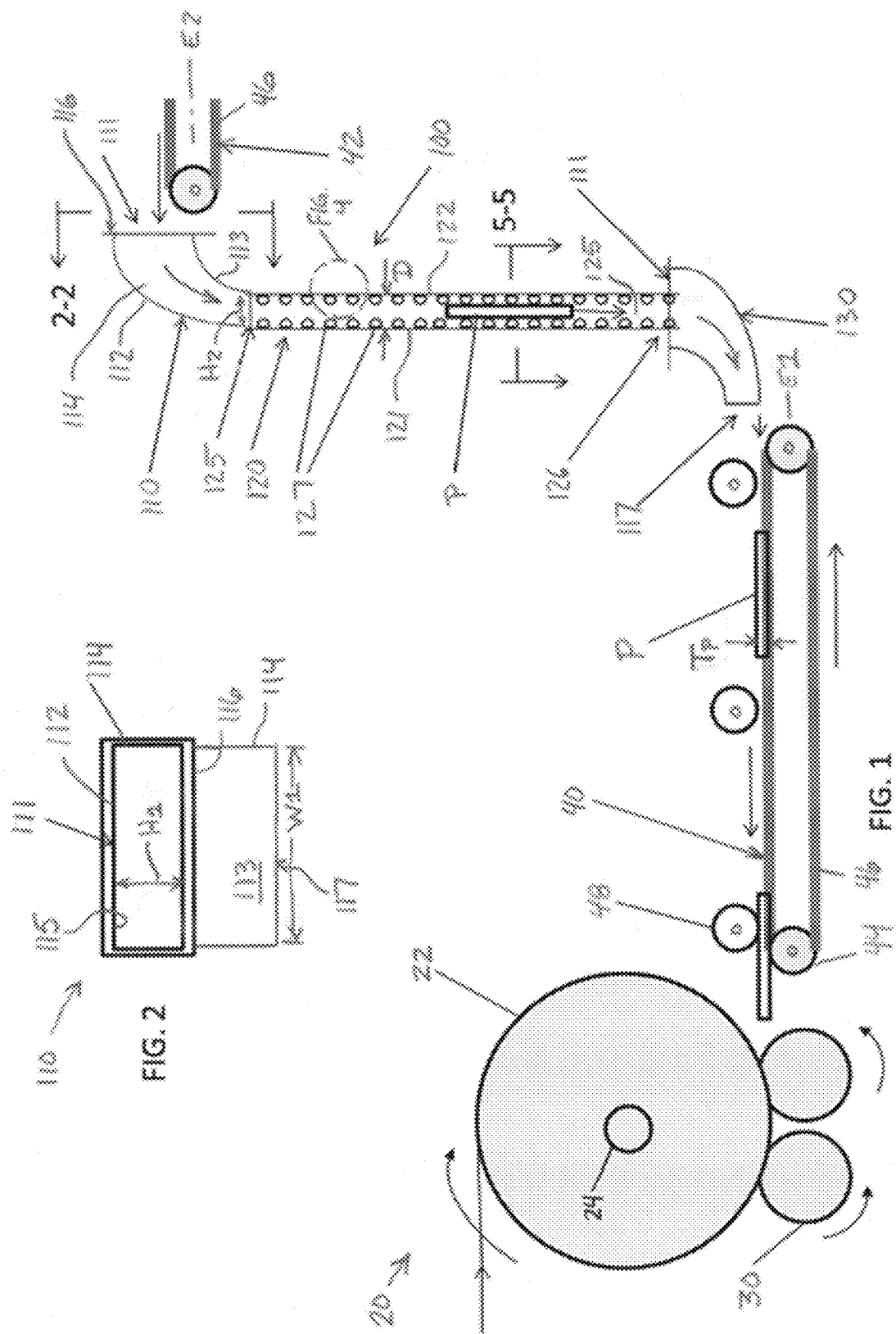

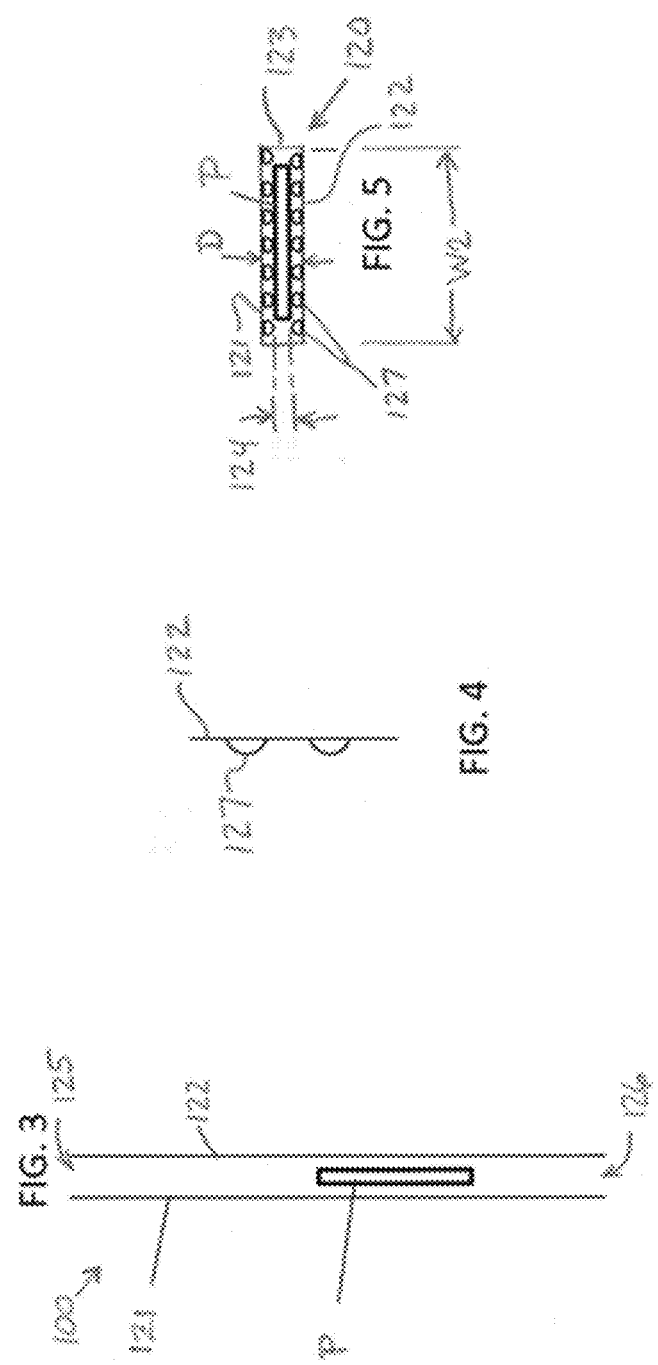

DROP CHUTE ASSEMBLY FOR PAPER HANDLING SYSTEM

CROSS-REFERENCE TO RELATED APPLICATIONS

This application claims priority to U.S. Provisional Patent Application No. 61/762,085, filed Feb. 7, 2013, the entirety of which is incorporated by reference herein.

FIELD

The disclosed systems and methods generally relate to paper handling, and more particularly to a drop chute assembly for paper handling conveyor systems.

BACKGROUND

Paper handling conveyor systems are used to transport individual thin sheets of paper for use in various types of commercial and industrial processes. Such conveyor systems generally include a moveable belt conveyor on which the paper travels and roller guides which engage and maintain contact between the sheets of paper and the belt. Since belt conveyors may transport the sheets of paper at relatively high speeds, the roller guides function to guide and provide positive feeding of the sheets of paper to various process delivery points.

One application for a paper transport belt conveyor systems is in the industrial printing and provision of individual paper labels. Industrial printing systems include one or more printers which print various indicia and/or images on a paper label, which may be provided with a water soluble dry adhesive backing. The individual labels may be of any size. After printing, the labels are fed one-by-one in serial fashion from the printer onto the belt conveyor for transport to a process delivery point where the label is affixed to various types of articles including without limitation large rolls of paper such as produced in a paper mill. Optimally, the labels are delivered to process delivery point with precise timing and placement to allow proper fixation to the article.

In some instances, there may be a difference in elevation between a belt conveyor at the initial delivery point of the paper label onto the belt conveyor from the printer and a belt conveyor at a process delivery endpoint due to commercial or industrial facility and process equipment layout. In some instances, spatial constraints may dictate that an abrupt change in elevation be provided in transporting the label between the two vertically spaced apart sections of conveyor belt.

SUMMARY OF THE INVENTION

In some embodiments, a drop chute assembly includes an entry chute, a drop chute, and an exit chute. The entry chute includes a first opening and a second opening. The first opening of the entry chute is sized and configured to receive paper traveling in a first direction, and the second opening of the entry chute is sized and configured to output paper traveling in a second direction that is different from the first direction. The drop chute includes a first opening a second opening. The first opening of the drop chute is positioned relative to the second opening of the entry chute to receive paper traveling in the second direction output from the second opening of the entry chute. The exit chute includes a first opening and a second opening. The first opening of the exit chute is positioned relative to the second opening of the drop chute to receive paper traveling in the second direction output from the second opening of the drop chute. The second opening of the exit chute is configured to output paper in a third direction that is different from the second direction.

In some embodiments, a paper transport system includes a first conveyor, a second conveyor, and a drop chute assembly. The first conveyor has a belt for transporting paper disposed at a first elevation. The second conveyor has a belt for transporting paper disposed at a second elevation that is different from the first elevation. The drop chute assembly is positioned between the first conveyor and the second conveyor. The drop chute assembly is configured to receive paper from the first conveyor and output the paper to the second conveyor.

In some embodiments, a paper transport system includes a paper transport system includes a first conveyor, a second conveyor, and a drop chute assembly. The first conveyor has a belt for transporting paper disposed at a first elevation, and the second conveyor has a belt for transporting paper disposed at a second elevation that is different from the first elevation. The drop chute assembly is positioned between the first conveyor and the second conveyor. The drop chute assembly is configured to receive paper from the first conveyor and output the paper to the second conveyor. The drop chute assembly includes an entry chute, a drop chute, and an exit chute. The entry chute includes a first opening and a second opening. The first opening of the entry chute is sized and configured to receive paper from the first conveyor traveling in a first direction, and the second opening of the entry chute sized and configured to output paper traveling in a second direction that is different from the first direction. The drop chute includes a first opening a second opening. The first opening of the drop chute is positioned relative to the second opening of the entry chute to receive paper traveling in the second direction output from the second opening of the entry chute. The exit chute includes a first opening and a second opening. The first opening of the exit chute is positioned relative to the second opening of the drop chute to receive paper traveling in the second direction output from the second opening of the drop chute. The second opening of the exit chute being configured to output paper to the second conveyor in a third direction that is different from the second direction.

BRIEF DESCRIPTION OF THE DRAWINGS

The features of the preferred embodiments will be described with reference to the following drawings, where like elements are labeled similarly, and in which:

FIG. 1 is a schematic diagram of an exemplary paper belt conveyor system with a drop chute assembly in accordance with some embodiments;

FIG. 2 is an elevation view of the entry chute of FIG. 1 taken along lines 2-2 in FIG. 1;

FIG. 3 is an elevation view of another example of a drop chute in accordance with some embodiments;

FIG. 4 is a close-up detail of a portion of the drop chute in FIG. 1;

FIG. 5 is a cross-sectional top view of the drop chute taken along line 5-5 in FIG. 1;

DETAILED DESCRIPTION

Figure 7:
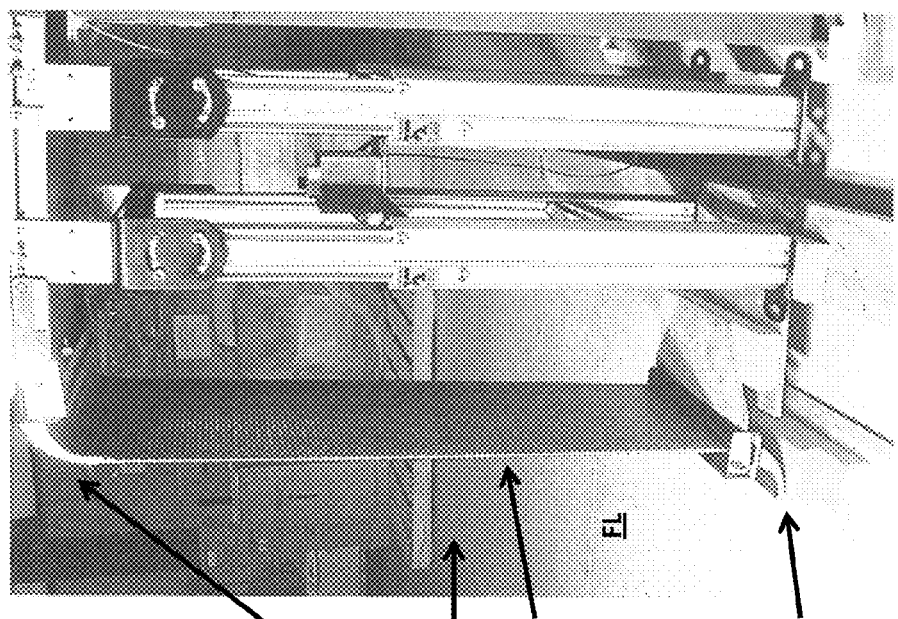
FIGS. 6 and 7 show one example of a drop chute assembly in accordance with some embodiments that was designed and tested.

The features and benefits of the present disclosure are illustrated and described herein by reference to exemplary embodiments. This description of exemplary embodiments is intended to be read in connection with the accompanying drawings, which are to be considered part of the entire written description. Accordingly, the present disclosure expressly should not be limited to such embodiments illustrating some possible non-limiting combination of features that may exist alone or in other combinations of features; the scope of the claimed invention being defined by the claims appended hereto.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "coupled," "affixed," "connected," "interconnected," and the like refer to a relationship wherein structures are secured or attached to one another either directly or indirectly through intervening structures, as well as both movable or rigid attachments or relationships, unless expressly described otherwise.

A drop chute assembly is provided in one embodiment according to the present disclosure that includes an entry chute, a vertical drop chute, and an exit chute. The drop chute assembly components are disposed proximate to each other to allow a sheet of paper to move smoothly through the assembly without substantial obstruction or resistance. In some embodiments, one or more of the drop chute components are closely coupled and/or physically connected together. The drop chute and entry/exit chute are configured and structured to be relatively rigid in some embodiments. In some embodiments, at least one or more of the drop chute assembly components may be made of a suitable metal.

In some embodiments, the entry and exit chutes may be funnel-shaped having a decreasing height between an inlet and outlet of the entry/exit chutes when measured along the paper flow path. In various embodiments, the drop chute includes a plurality of raised protrusions disposed on an interior surface of the drop chute which engage and guide the sheets of paper as they travel therein. In other embodiments, the interior surface of the drop chute is relatively plain and smooth without protrusions.

An exemplary embodiment of a drop chute assembly 100 according to the present disclosure will now be described for convenience with reference and without limitation to a paper handling conveyor system 20 as may be found in a paper mill, as shown in the schematic diagram of FIG. 1. The principles and features disclosed herein of the drop chute assembly may be used with equal advantage for conveyor systems of various configurations and in various commercial or industrial applications other than a paper mill. Accordingly, the present disclosure is not limited to any particular type or arrangement of paper handling conveyor system and may be used with equal advantage in any instance where it is desirable to change the elevation of the paper conveyance path between various vertical levels.

Referring to FIG. 1, paper handling conveyor system 20 includes a pair of rotating mandrels 30 which support and rotate a large roll 22 of paper being formed and wound around a core 24. A first lower belt conveyor 40 is provided at a first elevation E1 as shown which horizontally transports and feeds individual sheets of paper P onto the paper roll 22 (see directional arrows. In one embodiment, the paper P may be labels which may include an adhesive backing for affixing the labels to the paper roll. A second upper belt conveyor 42 is provided at a second elevation E2 higher than the first elevation and spaced vertically apart from conveyor 40 by a distance as shown. Belt conveyors 40, 42 include pulleys 44 and a continuous loop belt 46 which may be made of any suitable material. In some embodiments, without limitation, belt 46 may be made of any suitable commercially-available material including rubber, polymer or plastic, and other materials suitable for conveying paper. Belt conveyors 40, 42 further include roller guides 48 positioned at various locations to receive paper on belt 46, guide the paper along the belt 46, and discharge paper P from the belt 46.

In the paper handling conveyor system embodiment shown in FIG. 1, the final process delivery point for the paper P label is at the continuously forming paper roll 22. However, the initial starting point for paper P is at elevation E2 which may be from a source, such as an industrial printer (not shown), that operates to print and delivery/feed the label to belt conveyor 42. Therefore, the paper P must make a transition or change in elevation between the source and delivery point which are at elevations E2 and E1, respectively.

Referring to FIG. 1, the elevation or vertical transition in the paper P flow path is accomplished by means of a drop chute assembly 100. Drop chute assembly 100 includes an entry chute 110, drop chute 120, and exit chute 130. FIG. 1 depicts a cross-sectional side view of drop chute assembly 100. Note that although entry chute 110, drop chute 120, and exit chute 130 are described as separate pieces that are coupled together, one of ordinary skill in the art will understand that drop chute assembly 100 can be monolithic in that each of the chutes are combined together to form a single article of manufacture. For example, whereas in embodiments in which each of the chutes (i.e., entry, drop, and exit) of a drop chute assembly are described as having respective first and second openings, it will be understood that, in some embodiments, the output opening of the entry chute is directly coupled to and inseparable from the input opening of the drop chute, and that the output opening of the drop chute is directly coupled to and inseparable from the input opening of the exit chute.

Referring to FIGS. 1 and 2, entry chute 110 acts as a paper deflector which receives and changes the flow path of paper P by an angle. In one embodiment, as shown in FIG. 1, the flow path of paper P changes by about 90 degrees based on the configuration of entry chute 110. However, one of ordinary skill in the art will understand that the flow path of paper P can change by angles that are less than 90 degrees. As best seen in FIGS. 1 and 2, entry chute includes a face flange 116 for mounting the entry chute to a support frame (not shown), opposing front and rear walls 112, 113 respectively, and opposing side walls 114. The walls 112, 113, 114 define an inlet 111 in face flange 116, an outlet 117, and an open passageway 115 therebetween for conveying paper P through the entry chute (see directional paper flow path arrows in FIG. 1). In some embodiments, passageway 115 is arcuately-shaped or curved as shown in FIG. 1 to deflect and smoothly guide paper P from the inlet 111 to outlet 117. Inlet 111 is disposed at approximately a 90 degree angle to outlet 117 in one embodiment as shown wherein entry chute 110 acts as a 90-degree elbow or turn.

Entry chute 110 is mounted proximate to upper belt conveyor 42 as shown in FIG. 1. In various embodiments, entry chute 110 may be mounted to a portion of the frame of belt conveyor 42 or supported independently of the belt conveyor by a suitable support frame or other available structure or equipment in the facility.

In some embodiments, entry chute 110 may be formed of relatively thin sheet metal or metal plate wherein the walls 112-114 are formed and joined together by any suitable mechanical means such as without limitation welding, soldering, fasteners, or adhesives to list only a few possibilities. In various embodiments, the walls 112-114 may be metal and metal alloys comprising steel, aluminum, or others. In some embodiments, without limitation for example, the walls 112-114 may have a representative thickness on the order of inches. Any suitable thickness, however, may be used and will be apparent to one of ordinary skill in the art.

With continuing reference to FIGS. 1 and 2, front and rear walls 112, 113 may be curved or arcuately-shaped in some embodiments and define curved surfaces with respect to the paper P flow path. Opposing side walls 114 are curved or arcuately-shaped in configuration and profile as shown. In one embodiment, as best shown in FIG. 2, opposing side walls 114 may be equally spaced apart by a width W1 in a uniform manner between the inlet 111 and outlet 117 of entry chute 110 such that the walls 114 maintain an approximately parallel distance apart with respect to each other. In other embodiments, the distance between side walls 114 may gradually converge inwards towards each other to center paper P if the inlet 111 of entry chute 110 is wider than the drop chute 120 to form a smooth transition from the entry chute into the drop chute. However, in some embodiments, walls 114 do not converge inwards.

In one embodiment shown in FIGS. 1 and 2, entry chute 110 may be shaped as a funnel such that the front and rear walls 112, 113 converge inwards towards each other from the inlet 111 to outlet 117, thereby gradually narrowing the paper flow path between walls 112 and 113. This serves to guide the paper P into drop chute 120 in embodiments where the height H1 of inlet 111 is larger than the depth D of drop chute 120 as shown in FIGS. 1 and 2. In this embodiment, therefore, a corresponding height H2 of outlet 117 preferably is made approximately equal to the depth D of drop chute 120 for a smooth entry of paper P into the drop chute from entry chute 110.

Referring now to FIGS. 1 and 3, drop chute 120 is oriented vertically such that it is disposed approximately perpendicular to a floor (not shown) to provide a straight downward flow path and drop for paper P between upper belt conveyor 42 and lower belt conveyor 40. This is intended to provide an efficient free fall of paper P to maximize the effects of gravity while minimizing friction or potential static electrical attraction between the paper and drop chute 120 which might otherwise impede the progress and speed of the paper through the drop chute 120. For example, in some embodiments the paper P or other media may have a weight between 60-216 (gsm) and be coated or have a matte finish, dry gum adhesive, or plain bond. As noted below, various drop chutes have been designed and tested. Tests have been performed for chute lengths of 17 inches through 84 inches. It has been observed that general drop performance improves for larger drop distances. These tests were conducted using a set of 1½ inch wide stainless steel rollers to impede the fall of the media (paper). For 17 inch drop chutes, two inch diameter rollers applying 2 pounds per pair have been found to be suitable. For 84 inch drop chutes, three inch diameter stainless steel rollers with 2 pounds per pair were found to be suitable as the larger diameter has been demonstrated to absorb the shock of the drop without affecting the shape of the media.

Drop chute 120 includes an opposing front wall 121 and rear wall 122, and a pair of opposing side walls 123, as further shown in FIG. 5, which is a lateral cross-sectional view taken through the drop chute along line 5-5 in FIG. 1. The distance between side walls 123 define a width W2 and distance between the front and rear walls 121, 122 define a depth D of the drop chute 120. In some exemplary preferred embodiments, the width W2 is substantially larger than the depth D of the drop chute 120. Drop chute 120 further includes an open top inlet end 125 and an open bottom outlet end 126 as best seen in FIGS. 2 and 3.

In some embodiments, drop chute 120 may be formed of relatively thin sheet metal or metal plate wherein the walls 121, 122, and 123 are formed and joined together by any suitable mechanical means such as without limitation welding, soldering, fasteners, and adhesives to list only a few possibilities. In various embodiments, the walls may be metal and metal alloys comprising steel, aluminum, or others. In some embodiments, without limitation for example, the walls 121-123 may have a representative thickness on the order of inches. However, one of ordinary skill in the art will understand that any suitable thickness may be used.

In some embodiments, the top inlet end 125 of drop chute 120 may be rigidly fastened to outlet 117 of entry chute 110 as shown in FIG. 2 by any suitable mechanical means such as without limitation welding, soldering, fasteners, and adhesives to list only a few possibilities. In one embodiment, a welded attachment is used. In various other embodiments, outlet 117 of entry chute 110 may be disposed proximate to or protrude slightly down into inlet end 125 of drop chute 120 without any rigid attachment therebetween.

The inventor has discovered that providing an internal depth D (measured front to back as shown in FIGS. 2 and 5) for drop chute 120 that is just slightly larger than the thickness Tp of the paper P (FIG. 5) allows the paper to drop and accelerate quickly through the chute 120 to keep pace with the speed of the belt conveyors 40, 42 and paper P transported thereon. In side profile, a piece of paper has an aerodynamic shape with minimal drag or resistance as it falls through the air—provided the upper and lower surfaces of the paper are held relatively straight or parallel to the direction of travel and not permitted to bend excessively. If the paper is allowed to bends laterally as it falls vertically, turbulence will be produced causing the thin flexible sheet of paper P to deform and present more surface area to the airflow over the paper in the direction of travel, which in turn increases drag which will slow the speed of paper drop and lose pace with the belt conveyors, thereby interrupting the manufacturing process. In addition, excess deformation and deflection of the paper in a lateral/horizontal direction increases the likelihood of a paper jam in the drop chute 120.

Accordingly, maintaining an internal depth D of the drop chute 120 just slightly larger than the thickness Tp of the paper P advantageously keeps the paper vertically aligned and minimizes the chances for deformation as the paper drops to maintain pace with the belt conveyors 40, 42 and process flow. In some embodiments, depth D is preferably less than 20 times the paper thickness Tp, and more preferably less than 10 times the paper thickness in other embodiments. Depth D will therefore depend on the weight and thickness of paper used.

It will be appreciated that the enclosed drop chute design of the drop chute 120 further beneficially minimizes any effects of ambient air flow or drafts in the facility on the paper flow through the chute.

Referring to FIGS. 1, 4, and 5, drop chute 120 may include a patterned interior surface along the path of the paper P. In one embodiment, as shown in FIGS. 2 and 5, at least portions of the front wall 121 and rear wall 122 may be dimpled when fabricated to produce a plurality of arcuately-shaped convex protrusions 127 on the interior surface of these walls. The exterior surface of front and rear walls 121, 122 would have concave shaped depressions corresponding to each convex protrusion 127 on the opposite interior surface of the walls. This patterned surface may be produced by hammering or stamping one side of the metal sheets used to fabricate the front and rear walls. In some embodiments, the convex protrusions 127 are formed in #18 gauge stainless steel in an oxford pattern with textured dimples with a #2B finish. In some exemplary embodiments, the protrusions have a smoothly rounded convex surface to avoid snagging a piece of paper P as it travels through the drop chute 120. Any suitable arrangement and/or number of protrusions 127 may be provided. In some embodiments, multiple vertically staggered or offset horizontal rows of protrusions 127 may be provided as shown in the photos appended hereto.

The protrusions 127 advantageously guide paper P through the drop chute 100 while minimizing contact surface area between the paper and chute to reduce frictional drag as to not impede the speed of the paper. In some embodiments, the spacing 124 between protrusions 127 on the opposing front and rear walls 121, 122 is just slightly larger than the thickness Tp of the paper P (best shown in FIG. 5) which allows the paper to drop and accelerate quickly through the chute to keep pace with the speed of the belt conveyors 40, 42 and paper P transported thereon.

In some embodiments, such as the embodiment shown in FIG. 3, the interior surfaces of front and rear walls 121, 122 are relatively smooth and plain without any substantial surface features.

In various embodiments, the width W2 of front and rear walls 121, 122 may be substantially the same at the top inlet end 125 and bottom outlet end 126 so that the longitudinally-extending vertical opposing side walls 123 of the drop chute 100 remain substantially in parallel relationship to each other along the height of the drop chute. In other embodiments, the side walls 123 may be sloped and converge towards each other towards the bottom outlet end 126 of drop chute 100 to horizontally align and center the paper P as it drops through the chute. For example, without limitation, if paper P measures 8.5 inches×11 inches with the longer side being the leading edge of the paper as it travels through the drop chute 100, then the width W2 of the drop chute may be about 12 inches at top and reduce to as little as about 11.1 inches at bottom.

Referring again to FIG. 1, exit chute 130 of drop chute assembly 100 may be configured similarly to entry chute 110 and include the same component parts already described herein with respect to the entry chute 110. Exit chute 130, however, is oriented in an inverted manner as shown in FIG. 1 and positioned to receive paper P from drop chute 120 and deliver the paper P onto belt conveyor 40. Accordingly, exit chute 130 changes the flow direction and path of paper P, which in some embodiments as shown may be about 90 degrees based on the configuration selected for the exit chute. Open bottom outlet end 126 of drop chute 120 is positioned proximate to inlet 111 of exist chute 130. In some embodiments, the outlet end 126 may be at least partially inserted into inlet 111 as shown to ensure smoothly delivery of the paper P into the curved passageway 115 of the exit chute 130. Accordingly, inlet 111 of exit chute 130 is configured and dimensioned larger than and to receive bottom outlet end 126 of drop chute 120 therein.

Exit chute 130 may be mounted to and supported by drop chute 120 in some embodiments as shown in FIGS. 6-13 and described below. In various other embodiments, exit chute 130 may be supported independently of the drop chute 120 from any available structure or equipment including belt conveyor 40.

In operation, with reference to FIG. 1, the drop chute assembly 100 is positioned between upper and lower belt conveyors 42 and 40, respectively, such that the drop chute is located at the tail end of conveyor 42 and the head end of conveyor 40. Paper P enters entry chute 110 horizontally at the top of the drop chute assembly 100 (see paper flow path direction arrows). The paper changes direction by 90 degrees and becomes positioned vertically as it entered drop chute 120. Under the force of gravity and assisted by the initial velocity imparted to the paper P by the upper belt conveyor 42, the paper falls vertically through drop chute 120 and enters exit chute 130. The paper again changes direction by 90 degrees within exit chute 130 and becomes positioned horizontally as it exits from exit chute 130 whereupon the paper is delivered onto lower belt conveyor 40.

FIGS. 6-13 are photographs of an actual drop chute assembly 100 which was constructed and tested by the inventor. In these tests, the drop chute assembly 100 was observed to reliably move individual sheets of paper P through the assembly 100 without appreciable reduction in speed or velocity in travelling from the entry chute, through the drop chute 120, and outwards from the exit chute 130 between the upper and lower elevations E1, E2 of the chute assembly 100. As such, the paper P would be able to keep pace with the feed and removal belt conveyors so as to not impede the paper process flow.

Figure 6:
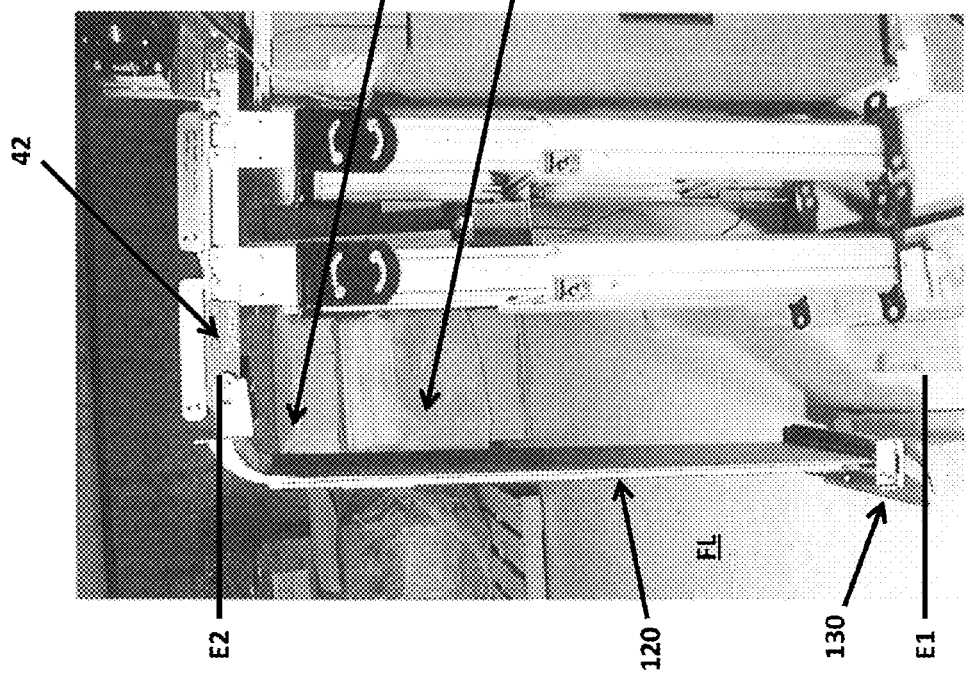

FIGS. 6 and 7 are side views illustrating a drop chute assembly 100 coupled to an upper conveyor 42. As shown in FIGS. 6 and 7, drop chute assembly 100 includes an entry chute 110 disposed at elevation E2 and coupled to a drop chute 120. Drop chute 120 is positioned such that it is approximately perpendicular to floor FL and is coupled to exit chute 130 at its lower end, which is located at elevation E1. The vertical drop between entry chute 110 and exit chute 130 is approximately 53 inches.

Figure 8:
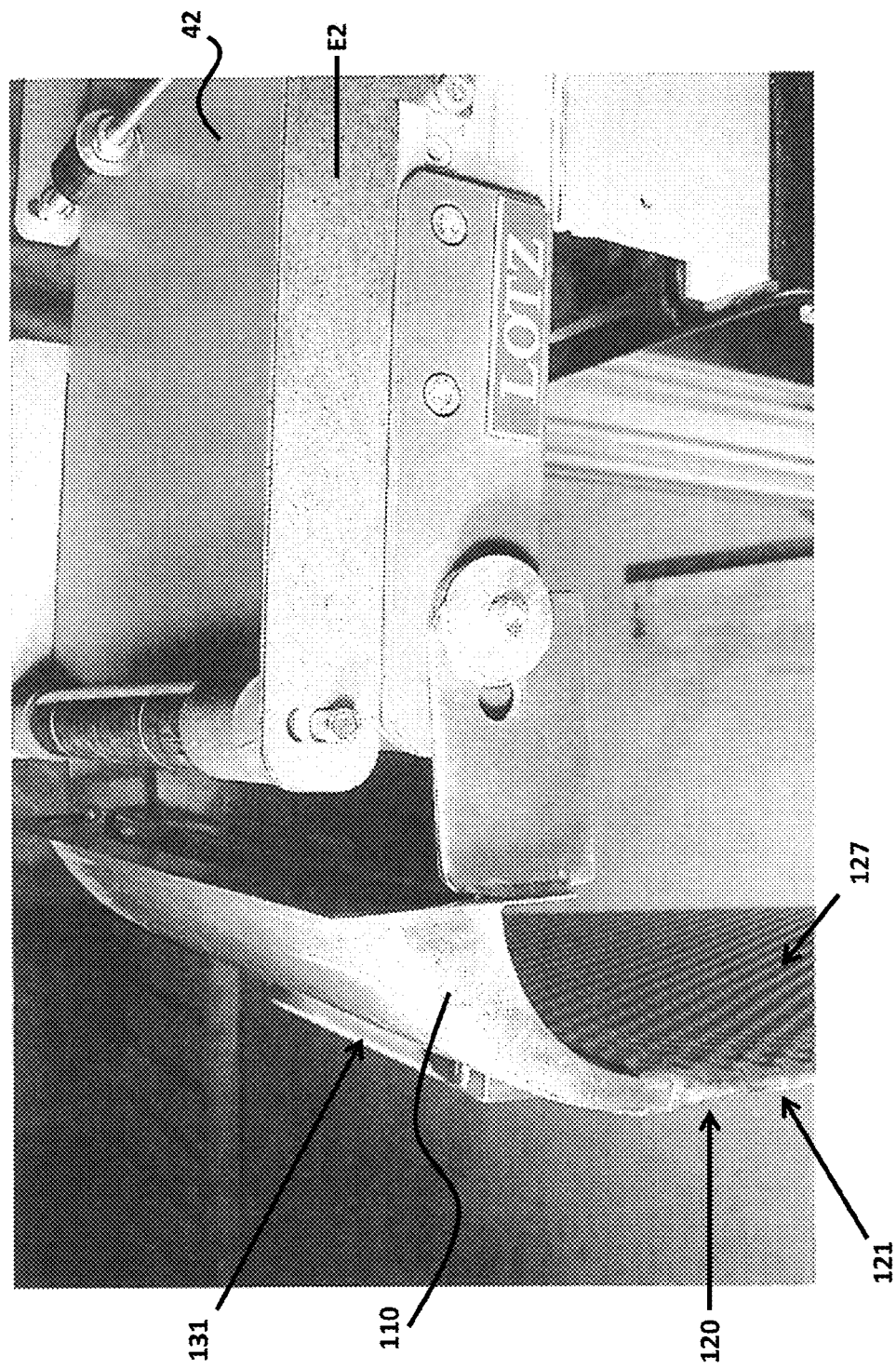
FIGS. 8 and 9 show close-up views of the entry chute of the drop chute assembly shown in FIGS. 6 and 7.
Figure 9:
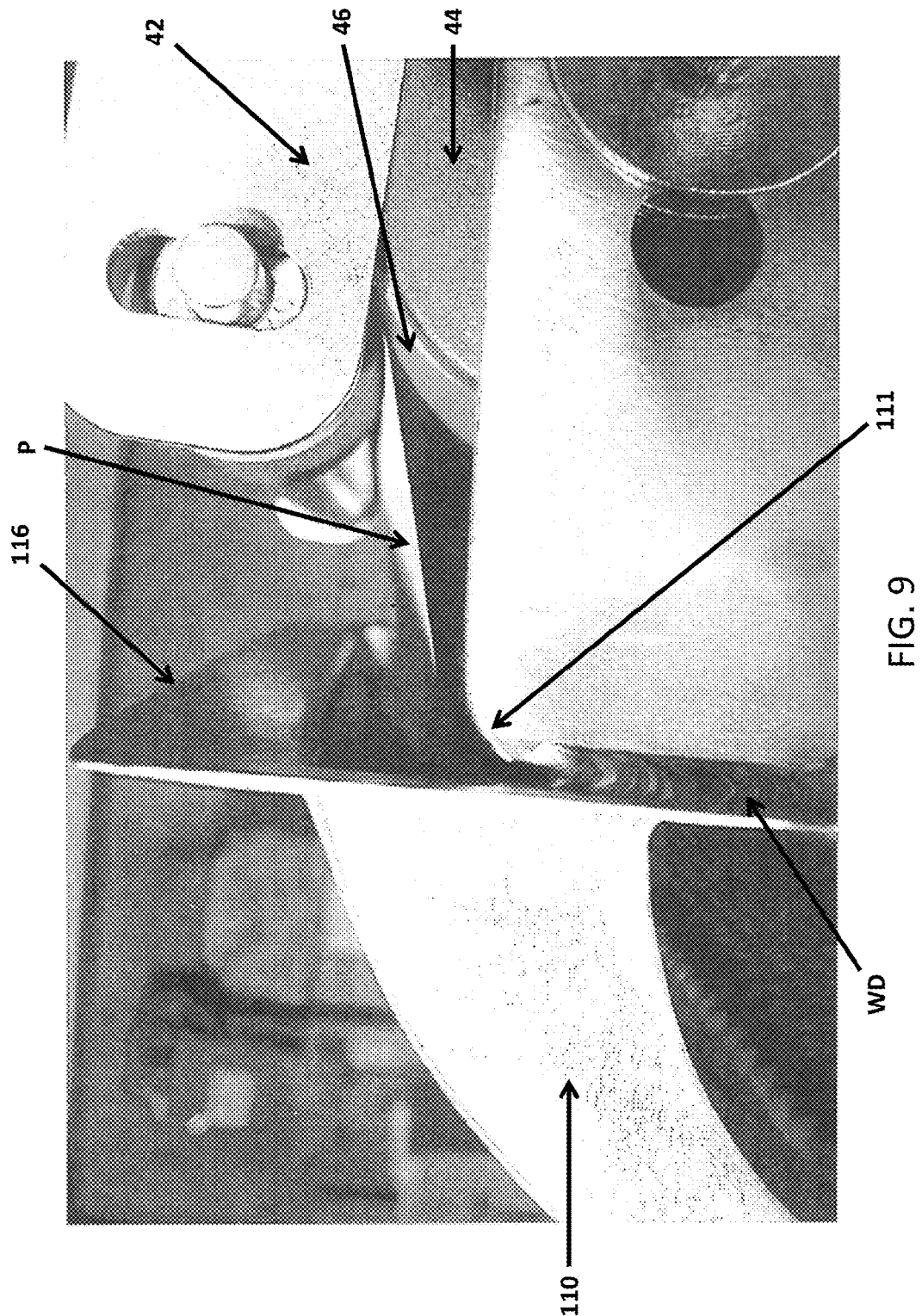

As best seen in FIGS. 8 and 9, a feed belt conveyor 42 is shown disposed adjacent to entry chute 110 such that the entry chute 110 is positioned to receive paper from conveyor 42. The entry chute 110 is mounted to conveyor 42 as shown. It will further be noted that the drop chute 120 may include an access door 131 (top portion of access door shown in FIG. 8) provided in front wall 121 of the drop chute 120 to allow an operator to clear any paper jams in the chute if they should occur. The access door 131 may extend for part of or substantially the full height of drop chute 120. Any suitable horizontal width or configuration of an access door may be provided. In some embodiments, the access door may be approximately 50% or less of the width W2 (see FIG. 1) of the drop chute 120. FIG. 6 further shows one possible dimpling pattern for internal protrusions 127 on the drop chute 120.

FIG. 9 provides a close-up view of the entry chute 110 shown in FIG. 8. Face plate flange 116 and opening 111 defined by entry chute 110 are shown in FIG. 9 as is a piece of paper P being transferred from the loop belt 46 driven by pulley 44 of conveyor 42. Weld WD connecting face flange 116 to conveyor 42 is also visible in FIG. 9.

Figure 10:
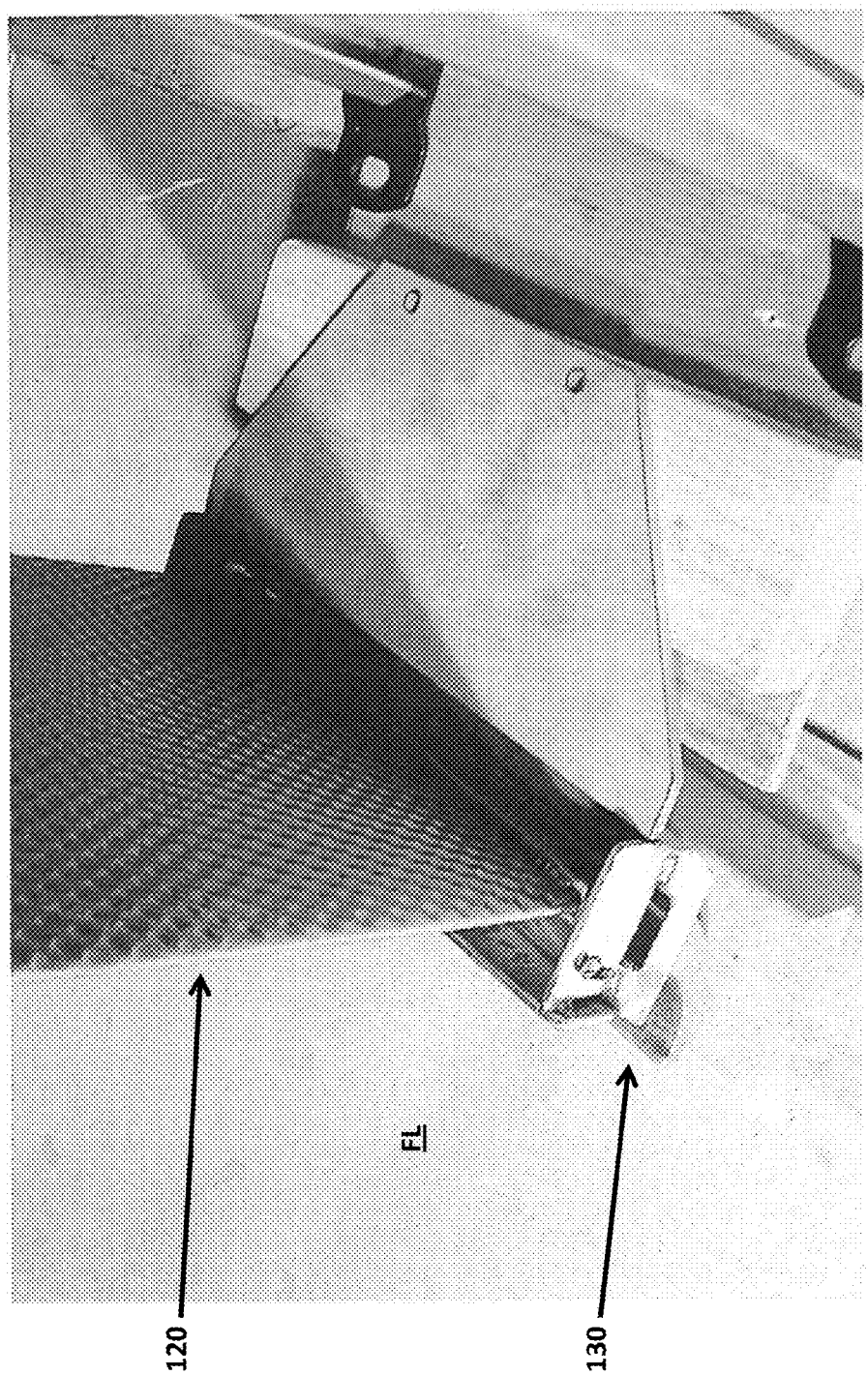
FIGS. 10-13 show various close-up views of the exit chute of the drop chute assembly shown in FIGS. 6 and 7.

FIGS. 10-13 provide various views of exit chute 130 and its coupling to drop chute 120. For example, FIG. 10 is a rear side view of drop chute 120 terminating at exit chute 130, which has an angled configuration such that paper traveling within drop chute 120 changes direction by approximately 90 degrees while traveling through exit chute 130.

Figure 11:
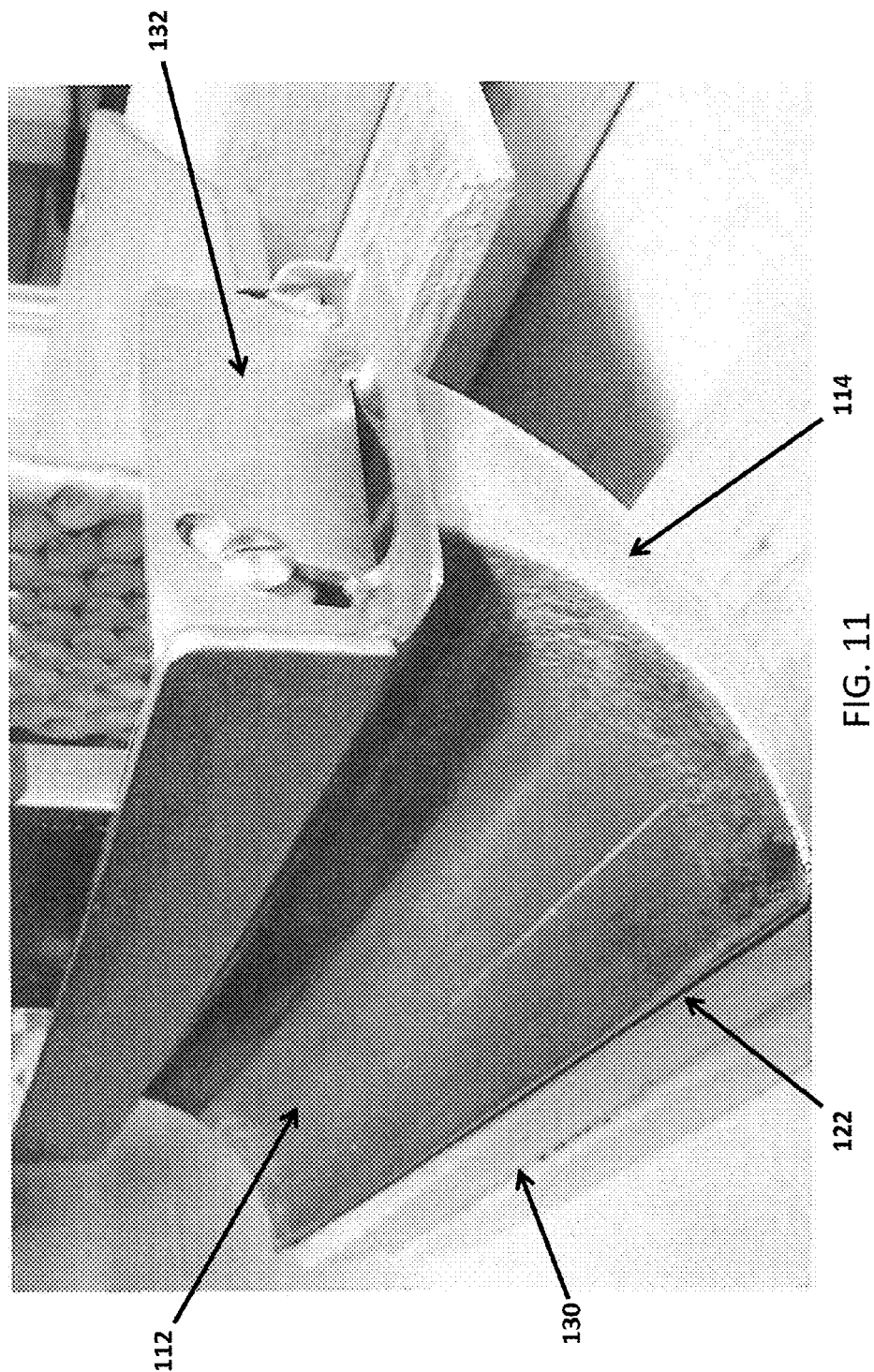
Figure 12:
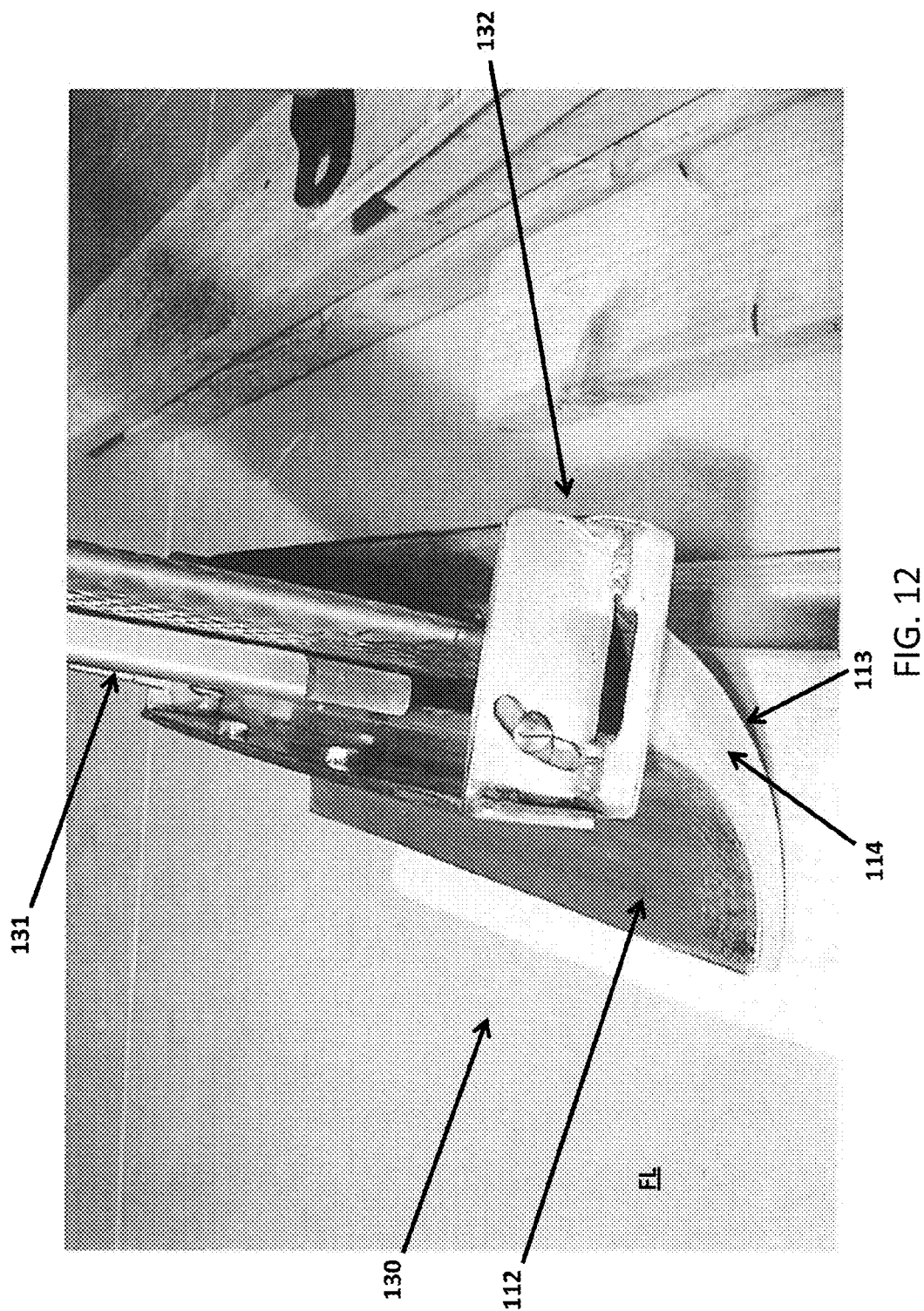
Figure 13:
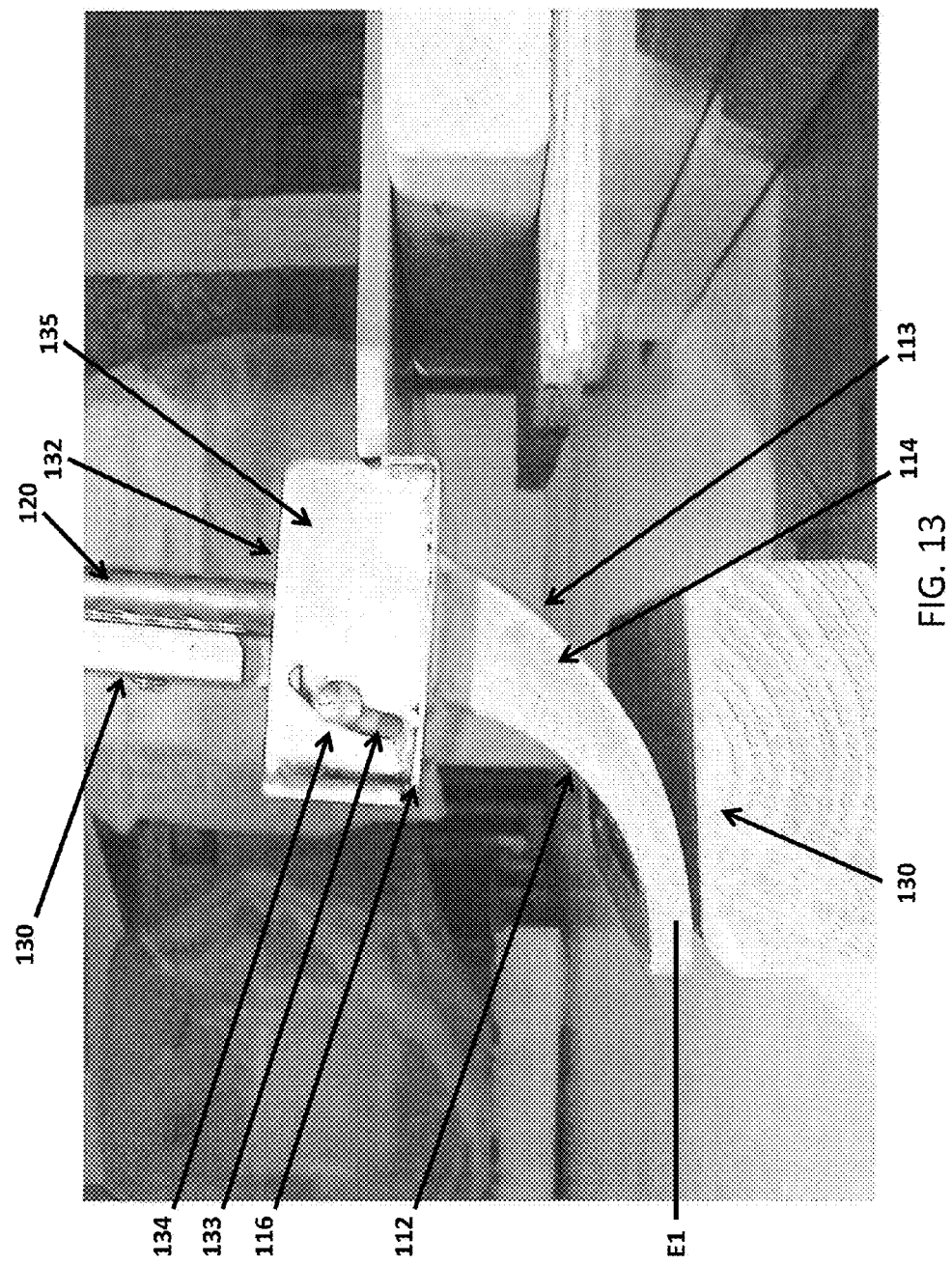

FIGS. 11-13 are close up views of exit chute 130, which is configured to output paper P (not shown) at elevation E1 as shown in FIG. 13. As shown in FIGS. 11-13, exit chute 130 includes a front wall 112, a rear wall 113, and side walls 114 (only one side wall 114 is visible in these figures). In some embodiments, an adjustment mechanism 132 is provided with exit chute 130. As best seen in FIG. 13, adjustment mechanism 132 allows the paper discharge angle to be adjusted so that the paper can be delivered in proper position onto the lower conveyor 40 (see FIG. 1). In this embodiments, the adjustment mechanism 132 includes the combination of an arcuately-shaped slot 133 with a fastener 134 that can be loosened and tightened to properly position the exit chute 130. The slot 133 is formed in a side plate 135 welded to face plate 116 on the exit chute 130. The fastener 134 may be rotatably mounted to a plate attached to the bottom portion of the drop chute 120 to allow the position of the exit chute 130 to be angularly adjusted with respect to the drop chute 120. It will be further noted that a portion of the access door 130 to drop chute 120 is also visible in these figures.

Figure 14:
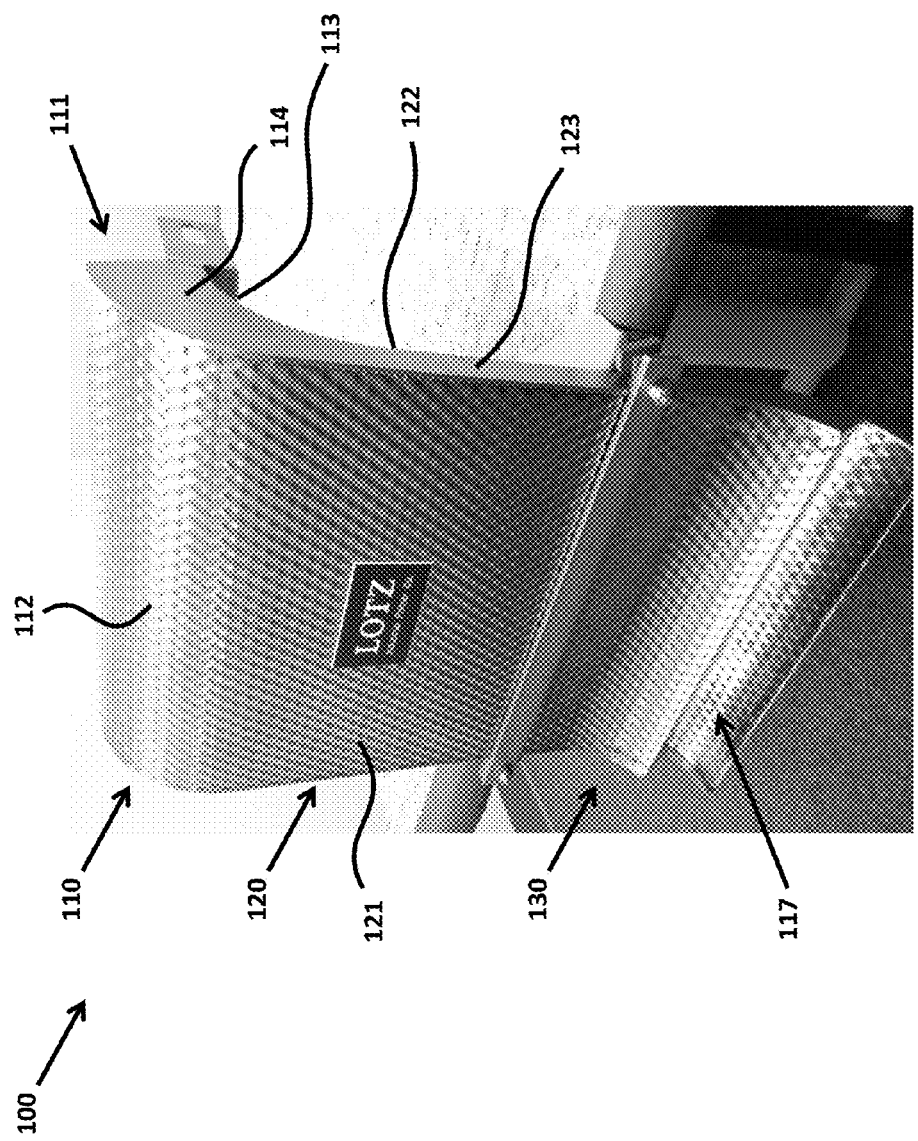
FIG. 14 is an isometric view of another example of a drop chute assembly in accordance with some embodiments.

FIG. 14 illustrates one example of a 17 inch drop chute assembly 100 that has been designed and tested. As shown in FIG. 14, drop chute assembly 100 includes an entry chute 110 including an inlet opening 111 defined by front wall 112, rear wall 113, and side walls 114. The outlet opening of entry chute 110 is coupled to an inlet opening of drop chute 120, which includes an internal passageway defined by front wall 121, rear wall 122, and side walls 123. The passageway extends between the top inlet opening of drop chute 120 and the bottom outlet opening of drop chute 120, which is connected to inlet opening of exit chute 130. Exit chute 130 includes an outlet opening 117 from which paper or other media is output.

Advantageously, embodiments of the drop chute assembly disclosed herein consume little lateral space and allows an abrupt change in elevation to be achieved while consuming very little lateral or horizontal space, as opposed to an angled or slanted belt conveyor arrangements which may be used to make elevation changes in situations where ample horizontal space is available. Accordingly, the drop chute assembly is readily adaptable to paper belt conveyor installations with spatial constraints of enumerable configurations. In addition, the drop chute assembly disclosed herein further advantageously does not impede the speed and concomitantly the paper flow through the belt conveyor system.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A drop chute assembly, comprising:
an entry chute including a first opening and a second opening, the first opening of the entry chute sized and configured to receive paper when the paper is traveling in a first direction, and the second opening of the entry chute sized and configured to output paper when the paper is traveling in a second direction that is different from the first direction;
a drop chute including a first opening a second opening, the first opening of the drop chute positioned relative to the second opening of the entry chute to receive paper traveling in the second direction output from the second opening of the entry chute, wherein an internal surface of the drop chute includes a plurality of inwardly extending protrusions; and
an exit chute including a first opening and a second opening, the first opening of the exit chute positioned relative to the second opening of the drop chute to receive paper traveling in the second direction output from the second opening of the drop chute, the second opening of the exit chute being configured to output paper in a third direction that is different from the second direction.

2. The drop chute assembly of claim 1, wherein the third direction is the same as the first direction.

3. The drop chute assembly of claim 1, wherein a height of the first opening of the entry chute is greater than a height of the second opening of the entry chute.

4. The drop chute assembly of claim 1, wherein an internal depth of the drop chute is less than twenty times a thickness of the paper.

5. The drop chute assembly of claim 1, wherein an internal depth of the drop chute is less than ten times a thickness of the paper.

6. The drop chute assembly of claim 1, wherein an elevation of the first opening of the entry chute is greater than an elevation of the second opening of the exit chute.

7. The drop chute assembly of claim 6, wherein the first opening of the entry chute is configured to receive paper from a first conveyor, and the second opening of the exit chute is configured to output paper to a second conveyor.

8. The drop chute assembly of claim 1, wherein the plurality of inwardly extending protrusions are disposed opposing front and rear inner walls, and wherein the plurality of inwardly extending protrusions comprise a spacing slightly larger than a thickness of the paper.

9. A paper transport system, comprising:
a first conveyor having a belt for transporting paper disposed at a first elevation;
a second conveyor having a belt for transporting paper disposed at a second elevation that is different from the first elevation; and
a drop chute assembly positioned between the first conveyor and the second conveyor, the drop chute assembly configured to receive paper from the first conveyor and output the paper to the second conveyor, wherein the drop chute assembly comprises an entry chute including a first opening and a second opening, the first opening of the entry chute sized and configured to receive paper when the paper is traveling in a first direction, and the second opening of the entry chute sized and configured to output paper when the paper is traveling in a second direction that is different from the first direction, and wherein an internal surface of the drop chute assembly includes a plurality of inwardly extending protrusions.

10. The paper transport system of claim 9, wherein the drop chute assembly includes:

a drop chute including a first opening a second opening, the first opening of the drop chute positioned relative to the second opening of the entry chute to receive paper traveling in the second direction output from the second opening of the entry chute; and an exit chute including a first opening and a second opening, the first opening of the exit chute positioned relative to the second opening of the drop chute to receive paper traveling in the second direction output from the second opening of the drop chute, the second opening of the exit chute being configured to output paper to the second conveyor in a third direction that is different from the second direction.

11. The paper transport system of claim 10, wherein the third direction is the same as the first direction.

12. The paper transport system of claim 10, wherein a height of the first opening of the entry chute is greater than a height of the second opening of the entry chute.

13. The paper transport system of claim 12, wherein an internal depth of the drop chute is less than twenty times a thickness of the paper.

14. The paper transport system of claim 12, wherein an internal depth of the drop chute is less than ten times a thickness of the paper.

15. The paper transport system of claim 10, wherein the plurality of inwardly extending protrusions are disposed opposing front and rear inner walls, and wherein the plurality of inwardly extending protrusions comprise a spacing slightly larger than a thickness of the paper.

16. A paper transport system, comprising:

a first conveyor having a belt for transporting paper disposed at a first elevation;

a second conveyor having a belt for transporting paper disposed at a second elevation that is different from the first elevation; and a drop chute assembly positioned between the first conveyor and the second conveyor, the drop chute assembly configured to receive paper from the first conveyor and output the paper to the second conveyor, the drop chute assembly including:

an entry chute including a first opening and a second opening, the first opening of the entry chute sized and configured to receive paper from the first conveyor when the paper is traveling in a first direction, and the second opening of the entry chute sized and configured to output paper when the paper is traveling in a second direction that is different from the first direction;

a drop chute including a first opening a second opening, the first opening of the drop chute positioned relative to the second opening of the entry chute to receive paper traveling in the second direction output from the second opening of the entry chute, wherein an internal surface of the drop chute includes a plurality of inwardly extending protrusions; and an exit chute including a first opening and a second opening, the first opening of the exit chute positioned relative to the second opening of the drop chute to receive paper traveling in the second direction output from the second opening of the drop chute, the second opening of the exit chute being configured to output paper to the second conveyor in a third direction that is different from the second direction.

17. The paper transport system of claim 16, wherein the third direction is the same as the first direction.

18. The paper transport system of claim 16, wherein a height of the first opening of the entry chute is greater than a height of the second opening of the entry chute.

19. The paper transport system of claim 16, wherein an internal depth of the drop chute is less than twenty times a thickness of the paper.

20. The paper transport system of claim 16, wherein the plurality of inwardly extending protrusions are disposed opposing front and rear inner walls, and wherein the plurality of inwardly extending protrusions comprise a spacing slightly larger than a thickness of the paper.

* * * * *